Patented July 13, 1948

2,445,299

UNITED STATES PATENT OFFICE 2,445,299

DRIED EGG POWDER

Mildred M. Boggs and Harry L. Fevold, Berkeley, Calif., assignors to the United States of America as represented by the Secretary of Agriculture No Drawing. Application February 28, 1946, Serial No. 650,932

2 Claims. (Cl. 99—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a method of forming dried egg powder, and has among its objects an improvement in the process of spray drying whereby the shelf life of the powdered egg is increased and the aeration properties when the powder is reconstituted and beaten are enhanced.

In general, according to the invention, egg emulsion is acidified, to adjust its pH to approximately 5.5. The acidified emulsion is then spray dried in the usual manner.

Hydrochloric acid is preferably used as the acidifying agent, 45 ml. N/1 HCl per liter egg emulsion being about the proper proportions to give the desired pH adjustment.

Before packaging, the resulting egg powder is intimately mixed with an amount of dry sodium bicarbonate equivalent to the acid added to the emulsion thus to neutralize the acid when the egg powder is reconstituted by mixing with water for preparation of foods.

Tests on egg powders prepared according to this invention, measured by palatability of scrambled eggs prepared from the powders, indicate that the shelf life is increased over the shelf life of unacidified powder 2.5 times when stored in air or nitrogen at 38° C., and 4 times when stored in carbon dioxide at a corresponding temperature.

In addition, the acidification has a marked beneficial effect on the stability of the natural pigments of the egg powders, thus improving the appearance of the stored powders and increasing consumer acceptance of the product.

Tests on the aeration properties of the egg powder are indicated in the table, in which each sample was reconstituted and beaten, the specific gravity being that of the resulting foam.

Table

| Sample | Specific gravity of foam |
|---|---|
| I. Unstored, unacidified | 0.60–0.70 |
| II. Fresh egg | 0.20–0.25 |
| III. Unstored, acidified | 0.24–0.28 |
| IV. 8 wks. stored in CO₂ at 38° C., acidified | about .40 |

The table shows by comparing sample III, the powder produced according to this invention, with sample I and sample II, that the aeration properties are greatly enhanced over those of egg powders produced without acidifying (sample I), and are essentially equivalent to those of fresh eggs (sample II). Even after storage, as indicated in sample IV, the aeration properties are much better than without acidification and unstored, although not as good as the aeration properties of fresh eggs.

Sponge cakes cannot be prepared from unacidified spray dried eggs, but sponge cakes prepared from egg powders produced according to the present invention are essentially equal in quality to those prepared from fresh eggs.

Having thus described the invention, what is claimed is:

1. A process of producing and packaging dried egg powder consisting of adding hydrochloric acid to an emulsion of egg to adjust the pH to about 5.5, then drying the acidified emulsion, adding to the dried product dry sodium bicarbonate in an amount equivalent to the hydrochloric acid added, and packaging the mixture of dry acidified egg emulsion and dry sodium bicarbonate.

2. A process of producing and packaging dried egg powder consisting of adding acid to an emulsion of egg to adjust the pH to about 5.5, then drying the acidified emulsion, adding to the dried product dry sodium bicarbonate in an amount equivalent to the acid added, and packaging the mixture of dry acidified egg emulsion and dry sodium bicarbonate.

MILDRED M. BOGGS.
HARRY L. FEVOLD.

REFERENCES CITED

The following references are of record in the file of this patent:

UNITED STATES PATENTS

| Number | Name | Date |
|---|---|---|
| 1,996,800 | Fischer | Apr. 9, 1935 |
| 2,140,781 | Allen | Dec. 20, 1938 |
| 2,237,087 | Littlefield | Apr. 1, 1941 |
| 2,280,147 | Fischer | Apr. 21, 1942 |
| 2,427,726 | Hopkins et al. | Sept. 23, 1947 |